United States Patent [19]

Seidel et al.

[11] 4,167,856
[45] Sep. 18, 1979

[54] SOLAR-THERMAL POWER PLANT

[75] Inventors: Albert Seidel; Dietmar Wolf, both of Siegertsbrunn, Fed. Rep. of Germany

[73] Assignee: Messerschmitt-Bölkow Blohm Gesellschaft mit beschränkter Haftung, Fed. Rep. of Germany

[21] Appl. No.: 741,933

[22] Filed: Nov. 15, 1976

[30] Foreign Application Priority Data

Nov. 27, 1975 [DE] Fed. Rep. of Germany ....... 2553283

[51] Int. Cl.² ............................................. F03G 7/02
[52] U.S. Cl. .................................. 60/641; 60/39.33; 60/659; 60/676
[58] Field of Search ................... 60/39.33, 641, 649, 60/650, 653, 659, 671, 676, 682

[56] References Cited

U.S. PATENT DOCUMENTS

| 2,714,289 | 8/1955 | Hofmann | 60/650 |
| 2,748,599 | 6/1956 | Keller | 60/650 X |
| 2,933,885 | 4/1960 | Benedek et al. | 60/641 |

FOREIGN PATENT DOCUMENTS 1122344  9/1956  France ....................................... 60/641

Primary Examiner—Allen M. Ostrager
Assistant Examiner—Stephen F. Husar
Attorney, Agent, or Firm—McGlew and Tuttle

[57] ABSTRACT

A solar-thermal power plant, comprises an open air circuit wherein the effective heat obtained from solar energy is supplied to the air current between a compressor and an expansion machine. The construction includes a solar heater which is exposed directly to solar radiation and which is traversed by the air current and provides a means for the direct solar heating of the air current which is conveyed from the compressor to the expansion machine.

6 Claims, 1 Drawing Figure

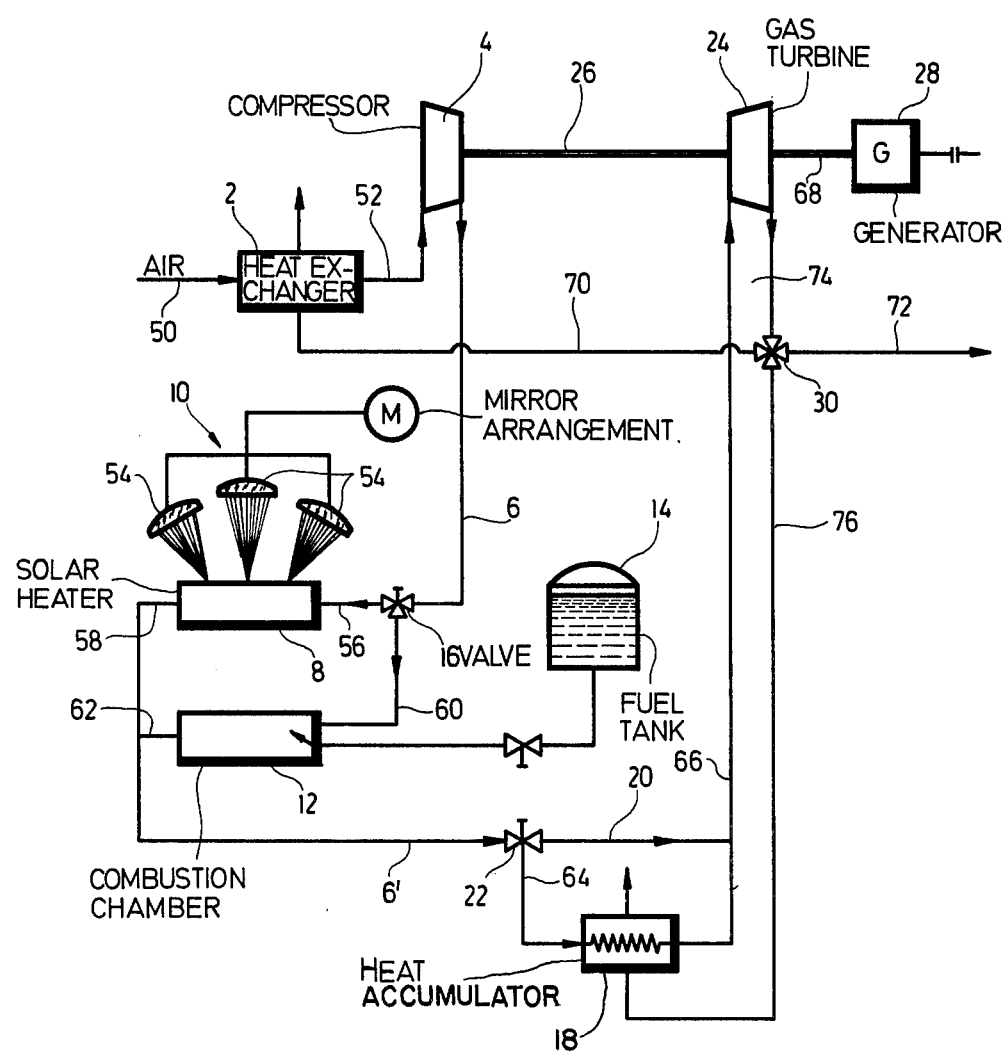

SOLAR-THERMAL POWER PLANT

FIELD AND BACKGROUND OF THE INVENTION

This invention relates in general to the construction of solar-thermal power plants and, in particular, to a new and useful solar-thermal power plant in which air is circulated through a solar heater which is exposed to solar radiation and is conveyed from a compressor which compresses the air to an expansion machine which is connected to a load, for example, for doing work such as driving a generator.

DESCRIPTION OF THE PRIOR ART

Solar-thermal power plants have an advantage over those with a closed steam circuit, in that they require no cooling devices and are generally easier to regulate. They are, therefore, particularly suitable for use in calm regions with little water and high solar radiation, for example, in desert regions.

A known solar-thermal plant having an open air circuit is disclosed in German Pat. No. DOS 1,476,714, where effective heat obtained by means of solar reflectors is transmitted by circulating a heat carrier to the working air current in a heat exchanger traversed by the air flow and arranged downstream of an air compressor. This construction has the disadvantage, however, apart from its complicated design, that it responds slowly, and this has an adverse effect in the frequent change of operations (cloud flight, change of day and night).

Furthermore, a solar power plant with an open gas turbine process is known from U.S. Pat. No. 3,203,167, wherein the main air current between compressor and turbine passes through an ultrasonic diffusor where it is heated by admixing a partial amount of air which has first been highly heated in a solar collector. This plant, however, also requires a large capital investment, and its output, relates to the air throughput, is low.

SUMMARY OF THE INVENTION

The invention provides a solar-thermal power plant with an open air circuit which has a high effective capacity with a low capital investment, and which permits rapid adaptation to fluctuations in solar radiation, particularly, a rapid start. The invention includes a solar-thermal power plant having a solar heater exposed directly to solar radiation which is traversed by the air current for direct solar heating of the air which is conveyed from a compressor to an expansion machine.

In the power plant according to the invention, an intensity increase in solar radiation is utilized rapidly and completely by the special type of air heating, and a rapid start of the plant is ensured, which is of particular importance under the frequently changing operating conditions of solar thermal power plants, with the special advantage that high-grade, practically loss-free heating of the compressed air current to the temperature level in the solar heater is achieved and a high specific output with a low capital investment is ensured.

In order to obtain a high operating temperature in the solar heater, the heater is preferably a high-temperature heat exchanger heated by focused solar radiation.

In order to compensate temporary intensity reduction of the incident solar radiation, it is advisable to arrange a heat accumulator between the solar heater and expansion machine. In this case, a bypass for the hot air current fed to the expansion machine is provided in a particularly expedient manner, so that the hot air current is fed directly to the expansion machine in certain operating phases, for example, when the plant is started, or with a rapid increase of solar radiation, without cooling in the heat accumulator and bypassing the latter, so that the heat accumulator can be heated by the hot air current to its higher temperature level only at a later date. A particularly favorable type of heating of the heat accumulator, where as little effective heat as possible is withdrawn from the hot air current is achieved by the exhaust air of the expansion machine with the hot air current switched to the bypass.

For further utilization of the waste heat obtained with the exhaust air, a counterflow-heat exchanger, heated by the exhaust air of the expansion machine, is preferably provided for preheating the air taken in by the compressor.

In a preferred embodiment of the invention, a combustion chamber is finally arranged parallel or in series with the solar heater between the compressor and expansion machine, in addition to the solar heater, to heat the air so that the plant can be operated with ordinary fuel, in case of insufficient solar radiation, in addition to or instead of the solar-thermal operation, for example, at night or when the solar radiation diminished or disappears for a longer period of time by cloud formation and the thermal capacity of any existing heat accumulator is exhausted.

Accordingly, it is an object of the invention to provide an improved solar-thermal power plant having an open air circuit, wherein, the effective heat obtained from solar energy is supplied to an air current which is moved through a compressor to the solar heater and then to an expansion machine wherein the solar heater provides for the direct solar heating of the air current.

A further object of the invention is to provide a power plant system which includes a preheater heat exchanger for heating air which is directed to a compressor for compression before it is delivered to a solar heater preferably for heating by focused solar rays and which is thereafter passed to the gas turbine to drive the turbine and, wherein, the solar heater is arranged in parallel with a combustion chamber which may operate to provide heat to the gas turbine when solar energy is not available and which also advantageously includes means for passing the gases from the turbine through a heat exchanger through which the heated air is passed, for example, for use in a preheater of the air before the air compressor.

A further object of the invention is to provide a solar-thermal power plant which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWING

In the Drawing:

The only FIGURE of the drawing is a schematic representation of a solar-thermal power plant constructed in accordance with the invention.

DESCRIPTION OF THE PREFERRED EMBODIMENT

Referring to the drawing in particular, the invention embodied therein, comprises a solar-thermal power plant which includes a conduit 50 for directing air into an inlet of a heat exchanger 2 for the preheating of air before it is directed through a conduit 52 into a compressor 4 where it is compressed. The compressed air is discharged through a pressure line 6 into a solar heater 8 which is in the form of a high temperature heat exchanger. Solar heater 8 comprises high-temperature resistant tubes through which the air is passed and which are exposed directly to solar radiation. The solar radiation is advantageously focused on the tubes through a plurality of mirrors or similar devices 54 which are advantageously positioned by a motor M so as to obtain the most beneficial use of the rays of the sun. The mirror arrangement 10 operates to maintain the solar heater at the highest temperature for the heating of air which is circulated therethrough an inlet 56 and out through a discharge 58 of the solar heater. Solar heater 8 is so designed that it has a minimum of reflection particularly in the infrared range.

In accordance with a feature of the construction, a combustion chamber 12 is arranged in parallel with the solar heater 8 and a control valve 16 is provided in a line 6 for shifting the air flow through a bypass line 60 and into the inlet of the combustion chamber for heating therein and for delivery out through a discharge line 62 into a combined line 6'. Combustion chamber 12 provides means for heating the air and permitting continuous operation of the plant even when the incident solar radiation drops considerably or in the absence of any solar radiation, for example, at night. The combustion chamber is supplied with fuel from a fuel tank 14 which, for example, may be kerosene. The amount of air which is switched into bypass line 60 by the regulating valve 16 will either increase or decrease with solar radiation up to the full working air current. Combustion chamber 12 can also be arranged in series with the solar heater, for example, downstream of the heater in which case, regulating valve 16 is eliminated and the combustion chamber heats the entire working air current when the heat supply in solar heater 8 drops below the value required for the operation of the plant. Combustion chamber 12 can also be turned on when the operation is started in order to permit a rapid start of the plant in addition to the direct heating of the air in the solar heater 8.

A heat accumulator 18 is arranged in a flow line 64 which connects to a valve 22 as does a bypass line 20. Valve 22 regulates the switching of the hot air current between the heat accumulator 18 and the bypass line 20 for flow into a inlet line 66 leading to a gas turbine 24.

The compressed hot air is expanded in the expansion machine 24 which is in the form of a single- or multiple-stage gas turbine. The gas turbine is arranged to drive a compressor 4 through a shaft 26 and a load 28 through a shaft 68 which, in the present case, comprises a generator G. In order to utilize the waste heat of the circuits, the exhaust air of the expansion machine 24 is passed through a regulating valve 30 which is connected to a heat source line 70 for the heat exchanger 2 and also to a discharge line 72. The exhaust gases passing through the line 74 to the valve 30 are advantageously directed to the heat supply line 70 for preheating the working air in heat exchanger 2 prior to its compression in compressor 4. In addition, this valve 30 may also provide for the flow of all or some portion of the discharge from the turbine through a supply line 76 to the heat exchanger 18 which forms a heat accumulator. Heat exchanger 18 provides for the preheating of the air being circulated and a counterflow heat exchange whenever its temperature is under that of the exhaust air. The remaining portion of the exhaust from the turbine exhaust line 74 may be directed to the atmosphere through the discharge line 72, if desired.

As long as heat accumulator 18 is preheated by exhaust air, the pilot valve 22 switches the working air current to bypass line 20 in order to prevent effective heat from being withdrawn from the working air during the preheating of the heat accumulator 18. After the exhaust air has been disconnected and valve 22 has been switched, heat accumulator 18 is heated further by the hotter working air and serves to compensate for any brief temperature fluctuations of the working air current, depending upon the heat capacity.

In certain other operating phases, where the exhaust air is disconnected from heat accumulator 18 and the accumulator has already been heated by working air above the preheating temperature, it may also be advisable to conduct the working air current by means of pilot valve 22, bridging heat accumulator 18, over bypass 20. This will be done when the temperature of the working air is above that of the heat accumulator 18 and the enthalpy of the hot air current is required for filling heat accumulator 18 but, primarily, for covering the power consumption of load 28. Valve 22 is also advantageously made infinitely adjustable in order to provide for fine regulation.

While a specific embodiment of the invention has been shown and described in detail to illustrate the application of the principles of the invention, it will be understood that the invention may be embodied otherwise without departing from such principles.

What is claimed is:

1. A solar-thermal power plant having an open air circuit, comprising a compressor for compressing the air having an inlet and a compressed air discharge, an expansion machine having a heated air inlet and an expanded gas discharge, and a solar heater having means for the direct solar heating of the air current having an inlet connected to said compressor discharge and a discharge machine, a heat accumulator arranged between said solar heater and said expansion machine having an inlet connected to the discharge of said solar heater and a discharge connected to said expansion machine inlet, a bypass extending from said discharge of said solar heater to the inlet of said expansion machine around said heat accumulator, means for directing the exhaust air from said expansion machine into said heat accumulator for preheating said accumulator, and means for selectively directing the air from said solar heater discharge to said bypass and said heat accumulator.

2. A solar-thermal power plant, according to claim 1, wherein said solar heater comprises a high temperature heat exchanger having means for focusing solar radiation.

3. A solar-thermal power plant, according to claim 1, including a combustion chamber in a bypass between said compressor discharge and said solar heater discharge and having means for heating air which is passed therethrough.

4. A solar-thermal power plant, according to claim 1, including a counterflow preheater connected to said expansion machine gas discharge for cooling the gases discharged therefrom and arranged before said compressor having an inlet for air and a discharge for preheated air connected to said compressor inlet.

5. A solar-thermal power plant having an open air circuit, comprising a compressor for compressing the air having a an inlet and a compressed air discharge, an expansion machine having a heated air inlet and an expanded gas discharge, and a solar heater comprising means for the direct solar heating of the air current and having an inlet connected to said compressor discharge and a discharge machine, a heat accumulator arranged between said solar heater and said expansion machine and having an inlet connected to the discharge of said solar heater and a discharge connected to said expansion machine inlet, a bypass extending from said discharge of said solar heater to the inlet of said expansion machine around said heat accumulator, said bypass being connected for the passage of air from said solar heater discharge, and means for selectively directing the air from the solar heater discharge to said bypass and said heat accumulator.

6. A solar-thermal power plant having an open air circuit, comprising a compressor for compressing the air having an inlet and a compressed air discharge, an expansion machine having a heated gas inlet and an expanded gas discharge, a solar heater having a solar heater inlet connected to said compressor discharge and having a solar heater heated air discharge connected to the inlet of said expansion meachine, said solar heater including means for concentrating solar rays for direct solar heating of the air passing through said solar heater inlet and out said solar heater discharge, bypass means extending from said compressor discharge to the solar heater discharge machine around said solar heater, said bypass means including a combustion chamber for heating of the air passing through said bypass means, and regulating means for controlling the portion of the compressed air flow delivered from said compressor to said combustion chamber and around said solar heater.

* * * * *